(12) United States Patent
Pellenc

(10) Patent No.: US 11,387,524 B2
(45) Date of Patent: Jul. 12, 2022

(54) DEVICE FOR ELECTRICALLY INTERCONNECTING BATTERY ELEMENTS, AND BATTERY OF ACCUMULATORS PROVIDED WITH SUCH A DEVICE

(71) Applicant: PELLENC, Pertuis (FR)

(72) Inventor: Roger Pellenc, Pertuis (FR)

(*) Notice: Subject to any disclaimer, the term of this patent is extended or adjusted under 35 U.S.C. 154(b) by 0 days.

(21) Appl. No.: 16/317,687

(22) PCT Filed: Aug. 28, 2017

(86) PCT No.: PCT/FR2017/052287
§ 371 (c)(1),
(2) Date: Jan. 14, 2019

(87) PCT Pub. No.: WO2018/050978
PCT Pub. Date: Mar. 22, 2018

(65) Prior Publication Data
US 2019/0198843 A1    Jun. 27, 2019

(30) Foreign Application Priority Data

Sep. 13, 2016 (FR) ...................... 1658489

(51) Int. Cl.
*H01M 50/502* (2021.01)
*H01M 50/503* (2021.01)
(Continued)

(52) U.S. Cl.
CPC ........ *H01M 50/502* (2021.01); *H01F 7/0252* (2013.01); *H01M 50/503* (2021.01); *H01M 50/522* (2021.01); *H01M 50/517* (2021.01)

(58) Field of Classification Search
CPC ............................................ H01M 2/202–208
See application file for complete search history.

(56) References Cited

U.S. PATENT DOCUMENTS

| 2008/0220293 A1 | 9/2008 | Marmaropoulos et al. |
| 2009/0017366 A1* | 1/2009 | Wood ...................... B60L 50/64 |
| | | 429/62 |

(Continued)

FOREIGN PATENT DOCUMENTS

| FR | 2920913 A1 | 3/2009 | |
| WO | WO2003090321 A1 * | 10/2003 | ............. H01R 13/62 |
| WO | WO-2015185827 A1 * | 12/2015 | .......... H01M 2/1077 |

OTHER PUBLICATIONS

International Search Report for PCT/FR2017/052287.

*Primary Examiner* — Ula C Ruddock
*Assistant Examiner* — Armindo Carvalho, Jr.
(74) *Attorney, Agent, or Firm* — Egbert, McDaniel & Swartz, PLLC

(57) ABSTRACT

A device for interconnecting battery elements has at least one electrically conductive strip with at least one contact area for a battery element, and at least one permanent magnet, which magnet is associated with the contact area and configured to apply the contact area to a terminal of a battery element by magnetic interaction with the battery element. The contact area of the strip has a stamped relief in the strip, the stamped relief forming a receptacle for a magnet. The magnet is housed within the receptacle for a magnet. Also disclosed is a battery of accumulators provided with the interconnection device. It is applicable to batteries for supplying power to handheld power tools, in particular.

17 Claims, 4 Drawing Sheets

(51) Int. Cl.
*H01M 50/522* (2021.01)
*H01F 7/02* (2006.01)
*H01M 50/517* (2021.01)

(56) References Cited

U.S. PATENT DOCUMENTS

| | | | | |
|---|---|---|---|---|
| 2011/0223776 | A1* | 9/2011 | Ferber, Jr. | H05K 3/325 |
| | | | | 439/39 |
| 2012/0100761 | A1* | 4/2012 | Grosse | H01M 50/571 |
| | | | | 439/774 |
| 2012/0164490 | A1* | 6/2012 | Itoi | H01M 2/105 |
| | | | | 429/7 |
| 2017/0187013 | A1* | 6/2017 | De Paoli | H01M 2/1077 |

* cited by examiner

DEVICE FOR ELECTRICALLY INTERCONNECTING BATTERY ELEMENTS, AND BATTERY OF ACCUMULATORS PROVIDED WITH SUCH A DEVICE

TECHNICAL FIELD

The present invention concerns a device for interconnecting battery elements and a battery equipped with such a device.

The battery elements are accumulators of electrical energy connected in series and/or in parallel for the formation of a battery of accumulators. The connection in series and/or in parallel of the battery elements is able to supply electrical energy with a voltage and a current adapted to an electric equipment for which the battery is intended. The interconnection of the battery elements also enables their concomitant recharge with electrical energy.

The present invention finds applications for supplying power to electrical equipment or portable power tools. It also finds applications for power supplies for light vehicles such as electric mowers or for road vehicles, for example. In general, the invention finds applications for any battery using juxtaposed battery elements and in particular cylindrical cells.

STATE OF PRIOR ART

Significant advances in the capacity of electric batteries and the reduction of their weight have generalized the use of electric motors in equipment and tools traditionally equipped with thermal engines. This is the case, for example, of electric equipment or tools such as mowers, pruning shears, hedge trimmers, chainsaws or blowers. Depending on the equipment or tools considered, the battery may be attached to the equipment, may be integrated into the tool body, or may be worn on the belt or on the back of an operator.

The electric batteries may be dedicated to a specific tool or may be adaptable for various tools.

The batteries may contain standard battery elements, generally in the form of cylinders juxtaposed and electrically connected by interconnecting electrical conductors. Other standard forms of elements do exist, as for example, prismatic forms which may also be used in the assembly of batteries.

The quality of the electrical contacts between the battery elements and the interconnecting conductors is not a critical parameter when the battery only needs to deliver weak currents of a few millimeters for example. As a matter of fact, the power F dissipated at a contact resistance R for the supply of a current I is provided by Ohm's law: $P=R*I^2$. Thus a very weak current dissipates a negligible power in the contact even with a relatively high contact resistance. On the other hand, this power being proportional to the square of the current going through the contact it is clear that it rapidly becomes very significant for strong currents. The energy lost by high resistance contacts then becomes not negligible. It actually increases with the number of contacts existing inside the battery, and because of the two terminals, positive and negative of each battery element.

This is the case, for example, for batteries having to deliver power equal to 2,000 watts, or even more, containing a high number of battery elements which may go as high as several dozens of elements with currents of several amperes going through each contact. This is even more the case for batteries comprising hundreds or even thousands of elements.

Typically, known batteries, consisting of 12 lithium-ion elements in series and 8 elements in parallel, or 96 battery elements in all, delivering, under a nominal voltage of 44 volts, a total current that can be over 45 amperes, or above 5.6 amperes at each battery element contact in operation, for a power of 2,000 watts.

Therefore, for high power batteries, it is necessary to take precautions to limit the electric resistance between the contact areas of the interconnection conductor and the terminals of the battery elements. A significant current passing through these parts would in effect be capable of generating an unacceptable overheating due to the Joule effect if the contact resistance is high, but above all an unnecessarily dissipated energy to the detriment of the working range of the tool or equipment plugged into the battery.

A significantly reduced contact resistance can be obtained by electric resistance spot welding of the interconnection conductor directly on the terminals of the battery elements. A spot welding presents in effect a particularly weak contact resistance, ranging generally between 0.08 and 0.13 milli-ohm.

On the other hand, such a welding has the disadvantages of having a weak contact surface and of being sensitive to vibrations and shocks. Considering the high number of battery elements in powerful batteries, multiplication of spot welds is then to the detriment of reliability of the battery. In effect the shock and vibration stresses on such an assembly lead to phenomena of fatigue at the contacts, progressively developing cracks on the weld spots. The cracks tend to cause oxidation of the weld spots which leads not only to a considerable increase in their contact resistance but also to inducing a partial or total break of the contact. These phenomena can make the battery inoperative. Damage-causing short-circuits can also result from the phenomena of contact fatigue.

Utilization of high-powered batteries with welded contacts thus poses problems for electric mowers or tools exposed to shocks and vibrations.

Furthermore, batteries with welded battery elements present a high dismantling cost at the end of their useful life, because of difficulties in separating welded battery elements.

Finally, a combination of conductive strips of copper or aluminum and battery elements with a low-carbon steel content poses problems of compatibility for the production of welds. Better compatibility is obtained with steel or nickel strips but at a prohibitive price in electrical resistivity.

Better immunity to shocks and vibrations is obtained by replacing the welded contact between interconnecting conductors and the terminals of the battery elements by a pressure contact.

Document FR 2920913 shows a battery in which interconnecting strips present contact areas maintained against the terminals of the battery elements by elastic means of pressure. These are, for example, flexible tongues that press the contact areas against the battery elements.

The contact resistance between the interconnecting strips and the battery elements depends in this case on the amount of pressure exerted on these parts to keep them in contact.

A quality contact therefore requires a means of spring action with high stiffness to generate significant pressure forces.

Here again, the utilization of powerful springs poses no problem as long as the number of battery elements to interconnect is low. But it becomes problematic for batteries with a large number of battery elements. In effect, the sum of the pushing forces of the contact areas on the terminals of the battery elements generates a not insignificant mechanical reaction load on the housing of the battery which envelops the battery elements so that it is necessary to provide a support structure and a housing dimensioned so as to contain without deformation the accumulated pressure of the springs.

This solution turns out to be less than satisfactory for batteries carried on the back or on the belt of an operator. The additional weight and volume created by the adaptation of the battery housing to the mechanical constraints runs in effect counter to a general objective to make the batteries lighter and more compact.

Yet another solution is to use permanent magnets in the positive and negative poles of the battery elements to interconnect them. As an illustration, one could cite document US2008/0220293 which provides for integration of permanent magnets with positive and negative poles of fine prismatic battery elements. The magnets exert a magnetic force of attraction which allows stacking battery elements and connecting them to a magnetic contact. The current circulates directly through the permanent magnet, which is to say a material known for its relatively high electrical resistance.

DISCLOSURE OF THE INVENTION

The present invention has the aim of proposing a reliable device for electrically interconnecting battery elements that does not present the limitations of known connection devices.

Another aim is to propose a device for electric interconnection with a weak contact resistance between contact areas and battery elements to be connected.

Another aim is to propose a device for electric interconnection adapted to high power batteries, for example batteries capable of delivering power of 2,000 or 3,000 watts.

And still another aim of the invention is to propose such an interconnecting device involving only a limited increase in the weight of the battery.

Finally, one aim is to propose an interconnecting device presenting a lower manufacturing cost than known devices, and in particular, a lower manufacturing cost than a welded interconnection.

In order to reach these goals, the invention proposes a device for electrically interconnecting battery elements comprising at least one electrically conductive strip with at least one contact area for battery element, and at least one permanent magnet associated to the contact area and configured for an application of the contact area on a terminal of a battery element by magnetic interaction with the battery element. In conformance with the invention:
  the contact area of the strip presents a stamped relief of the strip, the stamped relief forming a receptacle for a magnet,
  the magnet is seated in said receptacle for a magnet Such an interconnecting device is intended for battery elements with terminals in a material presenting ferromagnetic properties or terminals associated to a ferromagnetic material, that is to say a material on which the magnet can exert a force of attraction.

The stamped relief is considered to form a receptacle for the magnet when it conforms in shape to at least a portion of the magnet so as to create, with this portion, a junction by complementarity of shape or a junction by friction.

In the description which follows, and unless specified otherwise, reference is made to a single conductive strip and a single contact area of this strip. One needs however to keep in mind that this is only a simplification of the disclosure but that the interconnecting device may present a plurality of conductive strips and each strip can present a plurality of contact areas. In particular, for interconnecting the battery elements, a total number of contact areas corresponding to the number of terminals of the battery elements can be envisaged.

Thanks to the configuration of the contact area of the invention, it is possible to reduce or even to eliminate an air gap distance between the magnet and the battery element against which the magnet applies the contact area. It is thus possible to resort to contact areas and magnets of small dimension by limiting the weight of these magnets and by guaranteeing a satisfactory electrical contact.

Furthermore, by using a magnet to maintain the contact areas against the terminals of the battery elements a reliable electric contact can be guaranteed that is virtually shock and vibration-proof. In effect, such contacts afford a relative freedom of motion of the elements among each other depending on the demands on the battery while maintaining contact at the contact areas.

The relief of the contact area is formed in a single piece by stamping of the strip. The stamping can be produced, for example, by a punch and die adapted to the relief and to the size of the magnet to be seated in the receptacle formed by the relief.

Preferably, each contact area may feature an opening surrounded by an electric contact surface. The opening may present itself, for example, in the form of a simple hole made in the conductive strip in the middle of the contact area. This hole may be made at the time of the relief stamping by one end of the punch piercing the conductive strip.

In addition to further reducing the air gap between the magnet and the terminal of the battery element against which the contact area is applied, especially when the terminal is convex, the opening of the contact area is able to provide a contact with multiple points. The contact is considered to be a multiple points contact when the surface of the terminal of a battery element which generally presents a certain convexity comes into contact with the contact area not at a single point but at a plurality of points, for example a crown of points surrounding the opening. This results in weaker electrical contact resistance.

According to an interesting particularity of the invention, the device may furthermore include, for each contact area, a magnetic flux guide associated to the permanent magnet. The magnetic flux guide, without significantly increasing the weight of the interconnecting device, enables channeling the lines of magnetic flux of the magnet and reinforcing its action on the battery elements. Better pressure of the contact areas on the battery elements is thus obtained as well as weaker electrical contact resistance. And it is possible to use smaller and lighter magnets.

Furthermore, the interconnecting device also includes, for each contact area, a crimping armature for the magnet on the stamped relief. The crimping armature is preferably positioned around the magnet receptacle constituted by the stamped relief. The crimping armature thus makes it possible to ensure a good retention of the magnet in its seat and a good electric contact in spite of shocks and vibrations the electric battery might be exposed to.

Advantageously, the crimping armature can constitute the magnetic flux guide. This characteristic serves to simplify the crimping and to make the interconnecting device lighter.

According to a particular implementation of the device of the invention, the magnet may present a cylindrical shape, and the crimping armature may be a coaxial ring at the magnet and surrounding the magnet. More precisely a portion of the strip which forms the receptacle for the magnet may be interposed between the crimping armature and the magnet for crimping the magnet in its receptacle.

The crimping armature, especially when it forms a magnetic flux guide, may also present itself in the form of a capsule or a "pot" covering one of the poles of the permanent magnet. This form of implementation is able to further intensify the action of the magnet.

In a particularly advantageous manner, the contact area may be configured to extend itself essentially along a connecting plane and at least one of the magnet and the magnetic flux guide may be positioned so as to be flush with the connection plane.

This configuration presents the particularity of suppressing the air gap between the magnet or the magnetic flux guide and the terminal of the battery element on which the contact area is applied.

The reduction, or even the suppression of the air gap makes it possible to maximize the forces of attraction of the magnet and to increase the contact pressure exerted by the magnet. This results in a weaker electric contact resistance and the possibility of using smaller and lighter magnets.

The magnetic flux guide may preferably be either a guide made of low-carbon steel or a magnetized guide. If it is a magnetized guide, its action is combined with that of the magnet while also reinforcing that of the magnet.

In contrast to the devices known, the conductive strip of the interconnecting device of the invention does not need to present any elastic property or any spring effect in order to apply the contact areas on the battery elements. The application is simply due to the magnetic forces. Thus, and advantageously, the electrically conductive strip may include a copper strip or be constituted by a thin and light copper strip. According to other possibilities, the strip may be made of a material presenting weak magnetic characteristics and above all very weak resistivity, thereby limiting the losses of energy both at the contact areas and also in the connecting strip, it can therefore be made of metallic materials such as silver, aluminum, gold or other non-magnetic substrates with greater resistivity such as nickel or brass, but preferably plated with gold, silver, copper or aluminum.

Copper presents the particularity of excellent electrical conductivity. The conductive strip can thus be thin while still conserving weak electric resistance. The conductive strip may present, for example, a thickness between 50 and 200 micrometers. The fineness of the strip makes it also easily mouldable and ductile to accompany the establishment of contact of the contact area with a terminal of a battery element without exerting a restoring force capable of opposing the action of the magnet.

This results in a reliable contact with weak electric resistance.

The electrically conductive strip may also be silver-plated. The silver plating may present a thickness in the order of 2 micrometers, for example.

According to a particular implementation of the electrically conductive strip, it may present a shape of stretched band with a plurality of transversal and essentially coplanar appendices, each appendix being provided with a contact area. Such an adaptation of the strip proves to be particularly suitable for battery elements placed according to a regular matrix.

The invention also concerns a battery of electric accumulators comprising a plurality of battery elements presenting connection terminals and at least one interconnecting device such as described above, and connecting terminals of battery elements to one another.

According to one possibility of implementation of the battery, it may include at least one connection plane, each battery element presenting a terminal situated in the connecting plane.

In this case, the electrically interconnecting device connects, to one another, terminals of several battery elements situated in the connection plane.

When the battery elements present themselves in the form of bars with each end of them forming an electric terminal, the battery may present two connection planes in which are situated, respectively, the opposite electric terminals of each battery element.

In this case, and according to a possibility of implementation of the battery of the invention, the battery elements may be cylindrical elements extending perpendicularly to the connection planes.

The battery may also include at least one electric insulator presenting openings associated to terminals of the battery elements. In this case,
 the electrically interconnecting device may present an electrically conductive strip extending essentially along a strip plane, the strip plane being essentially parallel to the connection plane,
 the interconnecting device may present a plurality of contact areas, the contact areas protruding on the strip plane in the direction of the connection plane,
 for every contact area, at least one of the stamped relief, of a magnet seated in a receptacle formed by the stamped relief and of a magnetic flux guide associated to the magnet can come into contact with a terminal of a battery element in the connection plane by extending respectively through one of the openings of the electric insulator.

In this implementation, the connection plane and the plane of the electrically conductive strip forming the interconnecting device are offset at a distance either equal or slightly greater than the thickness of the electric insulator. Thus, only the contact areas in relief reach the terminals of the battery elements without risk of a short circuit, including during an accidental deformation of the conductive strip of the connection device.

The insulator may include a plate of electrical insulating material, the plate of electrical insulating material extending itself between the strip plane and the connection plane, it may in particular present itself in the form of a plate of plastic material where the grid opening is adapted to the shapes and dimensions of the stamped reliefs of the contact areas or the magnetic flux guides the contact areas are provided with.

In a particular configuration of the battery, presenting a first connection plane and a second connection plane, the second connection plane being opposite the first connection plane and essentially parallel to the first connection plane, each battery element may present, as mentioned previously, a first terminal situated in the first connection plane and a second terminal situated in the second connection plane. In that case, at least one electrically connecting device may be associated to each of the first connection plane and of the second connection plane, each interconnecting device connecting one to another the terminals of several battery elements situated in the first connection plane, respectively in the second connection plane.

Other characteristics and advantages of the invention will become clear in the description which follows with reference to the figures of the drawings. This description is given for illustrative purposes and is not limiting.

The drawings of the figures are represented in free scale.

DETAILED DESCRIPTION OF IMPLEMENTATIONS OF THE INVENTION

In the following description, identical or similar parts of the various figures are marked with the same references in order to facilitate the transfer from one figure to another.

Figure 1:
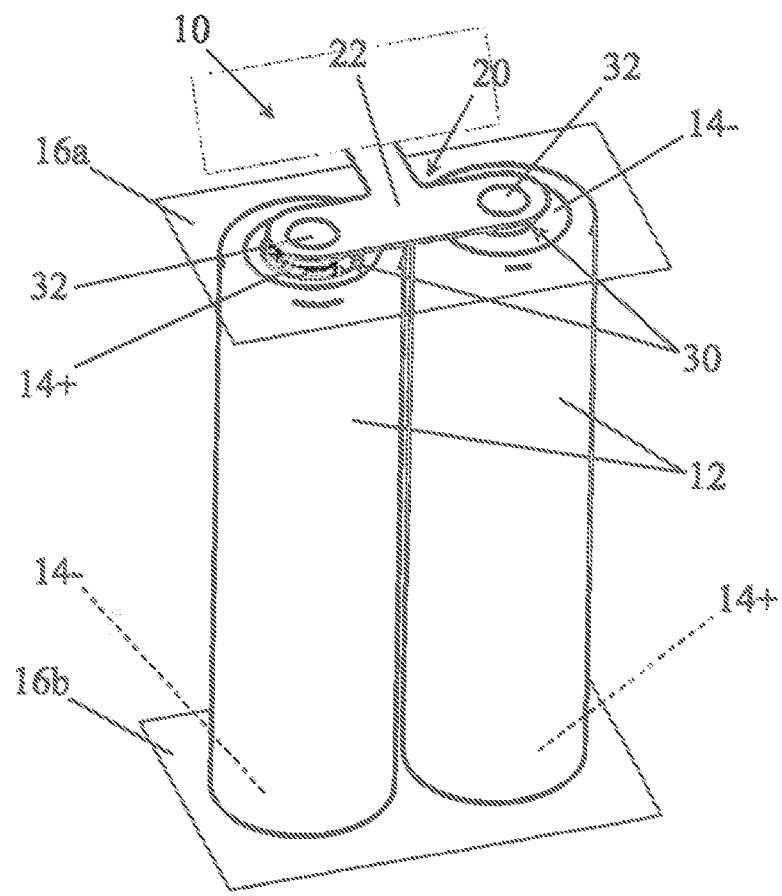
FIG. 1 is a much simplified illustration of a part of the electric battery conforming to the invention and utilizing an interconnecting device according to the invention.

FIG. 1 shows a battery of accumulators 10 including two battery elements 12. These are for example lithium-ion battery elements in the standard 18650 format. The battery elements present themselves in the form of cylinders with their ends forming respectively a positive terminal 14+ and a negative terminal 14−. The battery elements 12 are placed side by side and the positive and negative terminals 14+ and 14− of each battery element are laid out respectively in a first and a second plane of connection 16a, 16b.

The two battery elements of FIG. 1 are oriented 'head to tail' so that in each connection plane there is a positive terminal of one of the battery elements and a negative terminal of the other battery element. Such a disposition of the battery elements lends itself in particular to their connection in series. FIG. 1 also shows an interconnection device 20 extending in the first connection plane 16a and connecting between them the positive and negative terminals 14+ and 14− of the two battery elements 12.

The interconnection device includes an electrically conductive strip 22 provided with two contact areas 30. The contact areas are in electrical contact with the positive and negative terminals 14+ and 14− of the battery elements in the first connection plane 16a.

One can observe that each contact area is provided with a permanent magnet 32 which ensures the mechanical contact of the corresponding contact area 30 with a terminal of a battery element. The magnet 32 exerts magnetic forces of attraction on the terminals 14+, 14−, generally including a material attracted by the magnet to ensure maintenance of the electric contact between the terminal of the element and the associated contact area.

Figure 2:
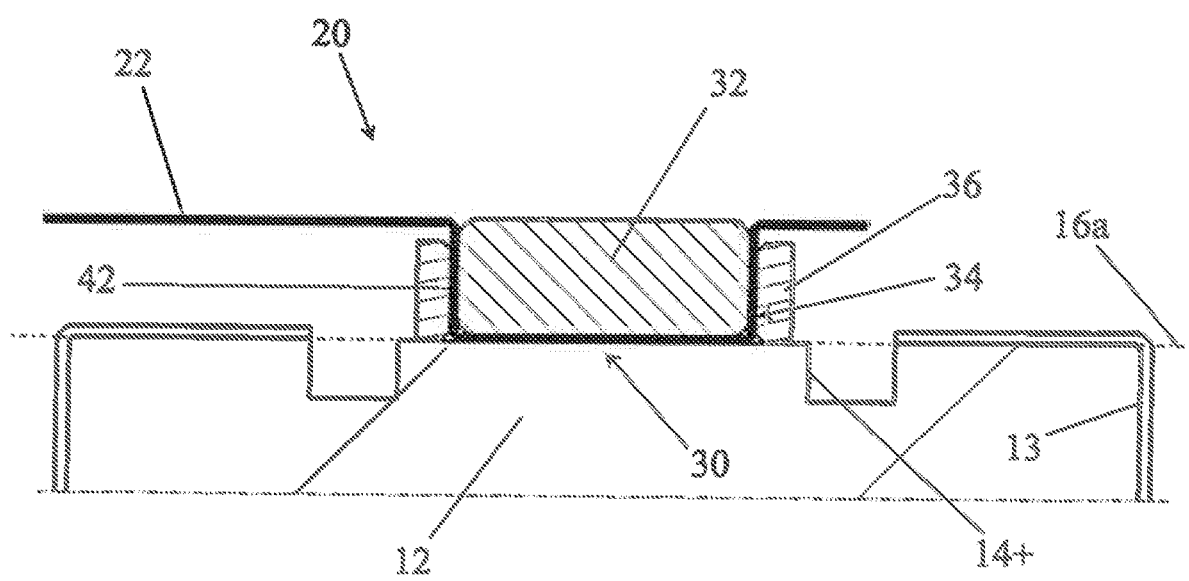
FIG. 2 is a section view of a part of an interconnecting device according to the invention.

The section of FIG. 2 shows a possibility of implementation of a contact area 30 of an interconnection device 20. This section is here made at the positive terminal 14+ of a battery element 12, in a longitudinal plane of the element comprising the axis of the magnet 32. The section would however be similar at the terminal 14− of the element 12. In the contact area 30, the electrically conductive strip 22 presents a stamped relief 34. The stamped relief forms here a cup 42 and constitutes a receptacle for the magnet 32. The stamped relief is formed by stamped or dying of a copper sheet forming the conductive strip 22.

In the example of FIG. 2, the magnet presents a cylindrical shape, and the cup 42 of the stamped relief 34 presents sufficient depth to receive the magnet 32 entirely.

The electrical contact with the terminal 14+ of the battery element 12, shown partially, is established by a part of the contact area 30 corresponding to the bottom of the cup forming the stamped relief 34. This part of the contact area constitutes an electrical contact surface.

The magnet 32 is kept in its seat by a crimping armature 36 in the form of low-carbon steel ring. More precisely, the ring constitutes, in the example of implementation shown, both the crimping armature and a magnetic flux guide. The low-carbon steel ring is in effect able to press the lateral walls of the seat formed by the stamped relief 34 against the magnet 32. It is also able to orient the lines of magnetic flux of the magnet from a face opposite the battery element towards the battery element.

Advantageously, the crimping armature which forms a magnetic flux guide is coaxial to the magnet 32 and surrounds the magnet.

When the crimping armature 36 has no function as a magnetic flux guide it can also be made of plastic material or aluminum.

The crimping armature 36 can also be made of a magnetic material and constitute itself a magnet which participates in the action of the magnet 32 seated in the stamped relief 34.

One can also observe that the battery element 12 features an insulating sleeve 13 of low thickness with the function of avoiding short-circuits between the positive pole and the container of the battery element generally constituting the negative pole.

In the case of FIG. 2 the contact area 30, corresponding here to the bottom of the cup formed by the stamped relief 34, the contact area extends along the first connecting plane 16a. One can observe that an edge of the crimping armature 36 adjacent to the connection plane 16a is flush with the connection plane.

So when the crimping armature serves as magnetic flux guide, an air gap between the magnetic flux guide and the terminal 14+ of the battery element can be zero when the contact area 30 is applied against the terminal 14+. It reduces the air gap of the magnet which is situated at a distance from terminal 14+, being separated from this terminal by the conductive strip 22, and thus improves the force of contact between the magnet 32 and the terminal 14+ and thus the contact between the conductive strip 22 and the terminal 14+ in the connection plane 16a.

In the example described, the electrically conductive strip 22 is a copper strip, for example of copper C11000, of a thickness of 0.1 mm, coated with a layer of silver of a thickness of 2 micrometer. The magnet is a magnet of type nickel-plated NdFeB which is seated in a cup 42 with a diameter of 5 mm and a depth of 2 mm. The crimping armature is a nickel-coated s235 steel ring with an outside diameter of 6.2 mm and a thickness of 2 mm.

These values are not limiting.

An implementation of the contact area as per FIG. 2 is adapted to bringing into contact a flat contact surface of the contact area with a terminal of an equally flat battery element.

However, the area of an electrical contact surface between the contact area of the interconnection device and the terminal of the battery may well be limited when the surface of the terminal 14+, 14− of the battery element 12 presents a slightly curved and convex shape. The contact may in effect well be limited to a point of tangency of the connection plane 16a, 16b, with the apex of the terminal 14+, 14− of the battery element 12.

Figure 3:
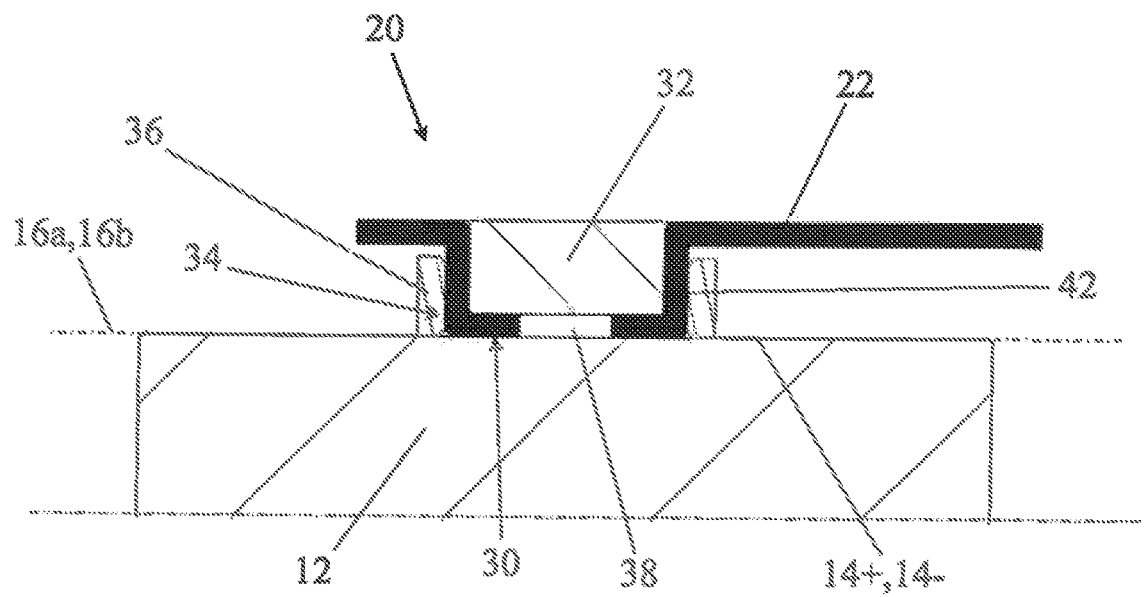
FIG. 3 is a schematic type section view of a part of an interconnecting device according to the invention and which constitutes a variant of implementation.

In order to increase the area of the contact surface, and thereby even further reduce the electrical contact resistance, including for batteries with terminals which are not perfectly flat, an implementation of the contact area as per FIG. 3 is being proposed. FIG. 3 is here created in schematic fashion.

The contact area 30 of FIG. 3 is similar to that of FIG. 1, except that the contact area surrounds an opening 38 made at the bottom of the cup 42 of the stamped relief 34. The opening 38 is preferably a round hole, preferably centered in the bottom of the cup 42 made by punching and in concomitant manner with the production of the stamped relief.

The presence of the hole ensures an annular distribution of the contact surface in the contact area 30, including when the terminal 14+, 14− of the battery element is slightly curved.

Figure 4:
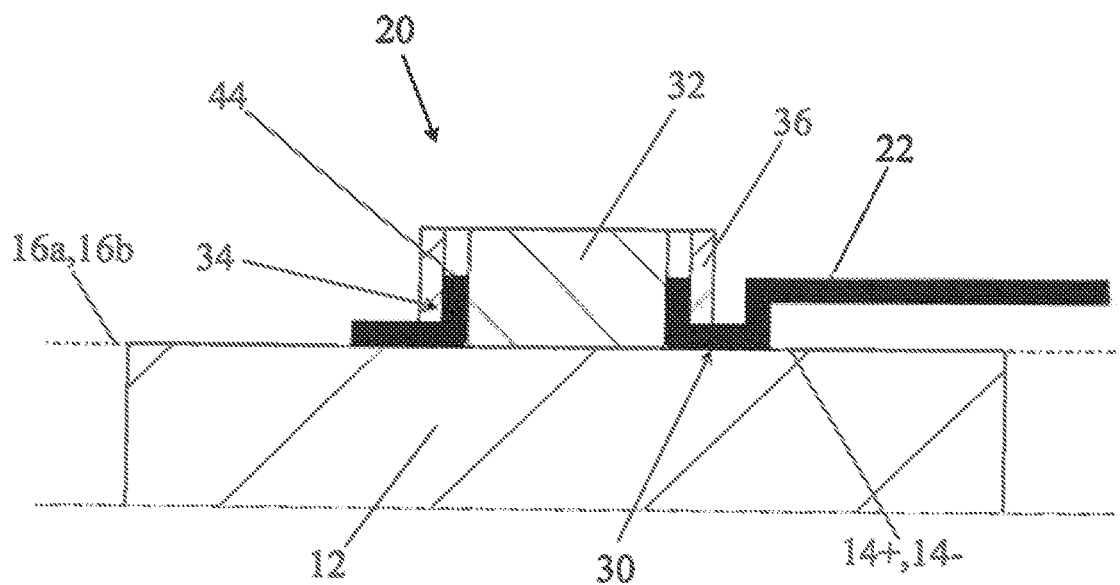
FIG. 4 is a schematic type section view of a part of an interconnecting device according to the invention and which constitutes another variant of implementation.

FIG. 4, also created in schematic fashion, shows yet another possibility of implementation of a contact area 30 according to the invention. The electrically conductive strip 22 of the interconnection device presents a stamped relief 34 in the shape of a small sleeve 44 defining a circular seat for the acceptance of the magnet 32. The sleeve 44 is made of one piece with the electrically conductive strip 22. It rises perpendicularly to the connection plane 16a, 16b, opposite the contact area 30, that is to say on a face of the electrically conductive strip 22 opposite the face of the strip coming into contact with a terminal 14+, 14− of the battery element 12.

The crimping of the magnet 32 occurs by means of a crimping armature 36 in the shape of a soft-iron ring surrounding the sleeve 44 and which clamps the sleeve onto the magnet 32. The soft-iron ring, as for the examples of implementation of the preceding figures, does also serve as a magnetic flux guide.

The contact between the interconnection device 20 and a terminal 14+, 14− of the battery element 12 is made by an annular contact surface of the contact area 30 which surrounds the magnet.

On can observe on FIG. 4 that the magnet 32 is flush with the connection plane 16a, 16b defined by the contact surface of the contact area 30. This characteristic is particularly advantageous in so far as an air gap, which is to say a space between the magnet and the contact terminal of the battery element may be very small or even zero. This results in improved efficiency of the magnet and greater attractive force applying the contact area 30 against the battery element.

By comparison, the air gap between the magnet 32 and a terminal 14+, 14− of the battery element 12, in the implementations of FIGS. 2 and 3, is equal to the thickness of the electrically conductive strip 22.

The implementation of FIG. 4 the magnet 32 can be positioned either flush with a connection plane 16a, 16b of the contact area 30 or very slightly set back from the connection plane. A zero air gap or of a thickness less than 0.1 mm can be obtained.

Figure 5:
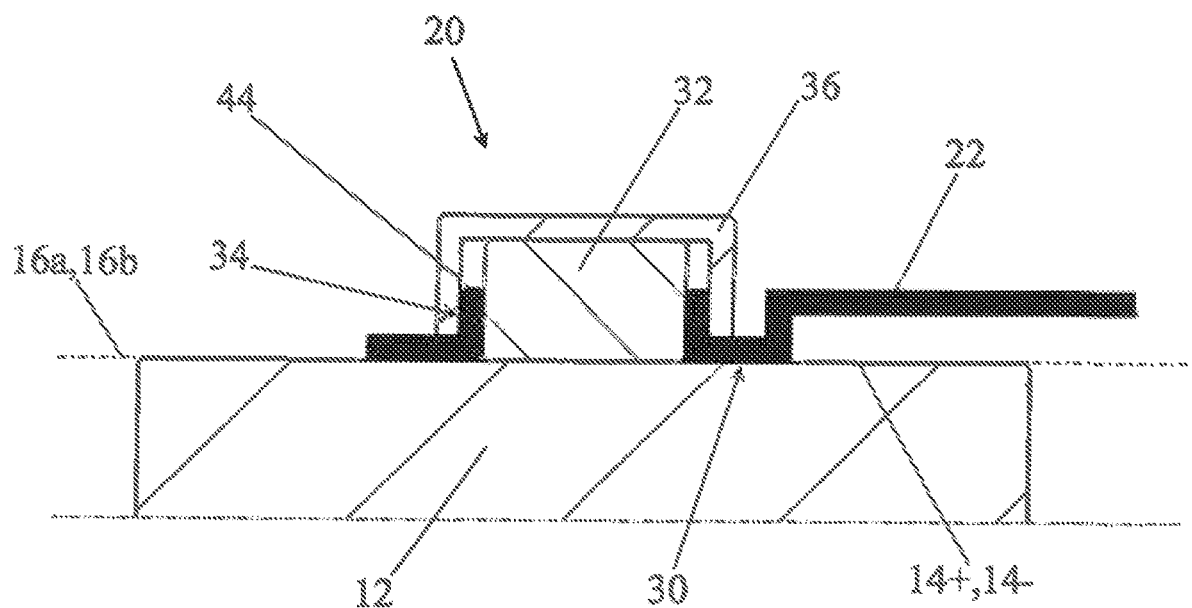
FIG. 5 is a schematic type section view of a part of an interconnecting device according to the invention and which constitutes yet another variant of the implementation.

FIG. 5, also prepared in schematic fashion, shows yet another possibility of implementation of a contact area 30. It constitutes a simple variant of the one in FIG. 4.

The stamped relief 34 of the contact area in FIG. 5 is identical with that of the contact zone in FIG. 4. Unlike FIG. 4 however, the crimping armature 36 is not a ring but a crimping pot or capsule which is on top of the magnet 32. In the example described, it is a soft-iron capsule.

By implementing a crimping armature in the form of a capsule or a pot the magnetic lines of flux of the magnet can be channeled even better towards the battery element when the crimping armature 36 is used as magnetic flux guide. Furthermore, taking into consideration a height of the sleeve 44 inferior to that of the magnet, utilization of a crimping armature in the form of a capsule of a determined depth allows a fine adjustment of the position of the magnet 32 relative to the connection plane 16a, 16b, during the crimping.

In the example of FIG. 5, the magnet presents a face flush with the connection plane 16a, 16b.

Figure 6:
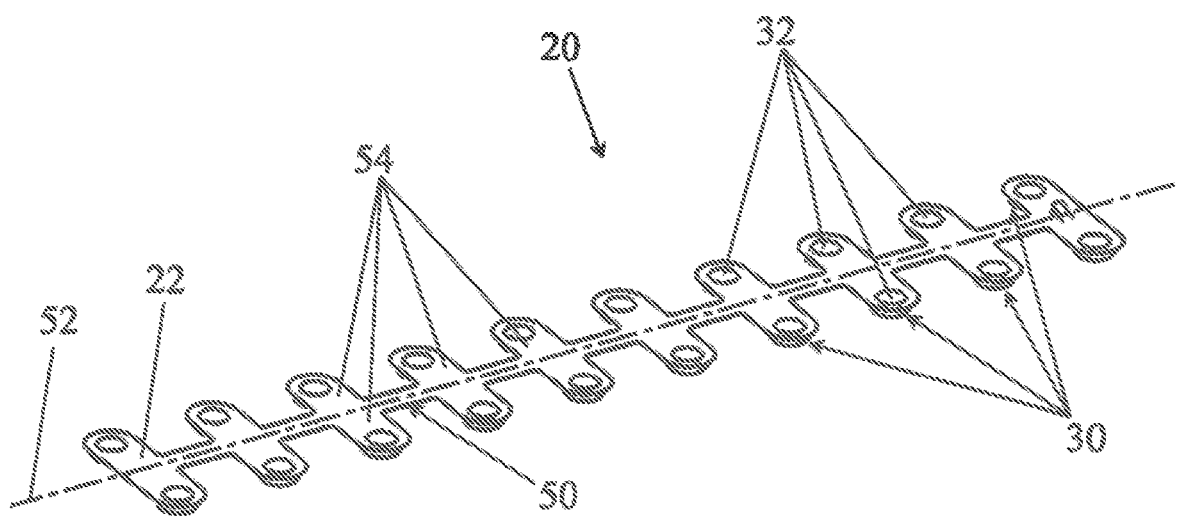
FIG. 6 is a perspective view of an interconnecting device according to the invention.

FIG. 6 shows an interconnecting device 20 according to the invention and meant for a plurality of battery elements. The device of FIG. 6 includes an electrically conductive strip 22 in the form of a central elongated band 50, extending along a main axis 52 and provided with a plurality of appendices 54. The appendices 54 extending radially on either side of the central band 50, and perpendicularly to the main axis 52. Each appendix 54 is provided at its end with a contact area 30 provided with a magnet 32. The configuration of the contact areas corresponds, for example, to that of FIGS. 2 and 3.

Figure 7:
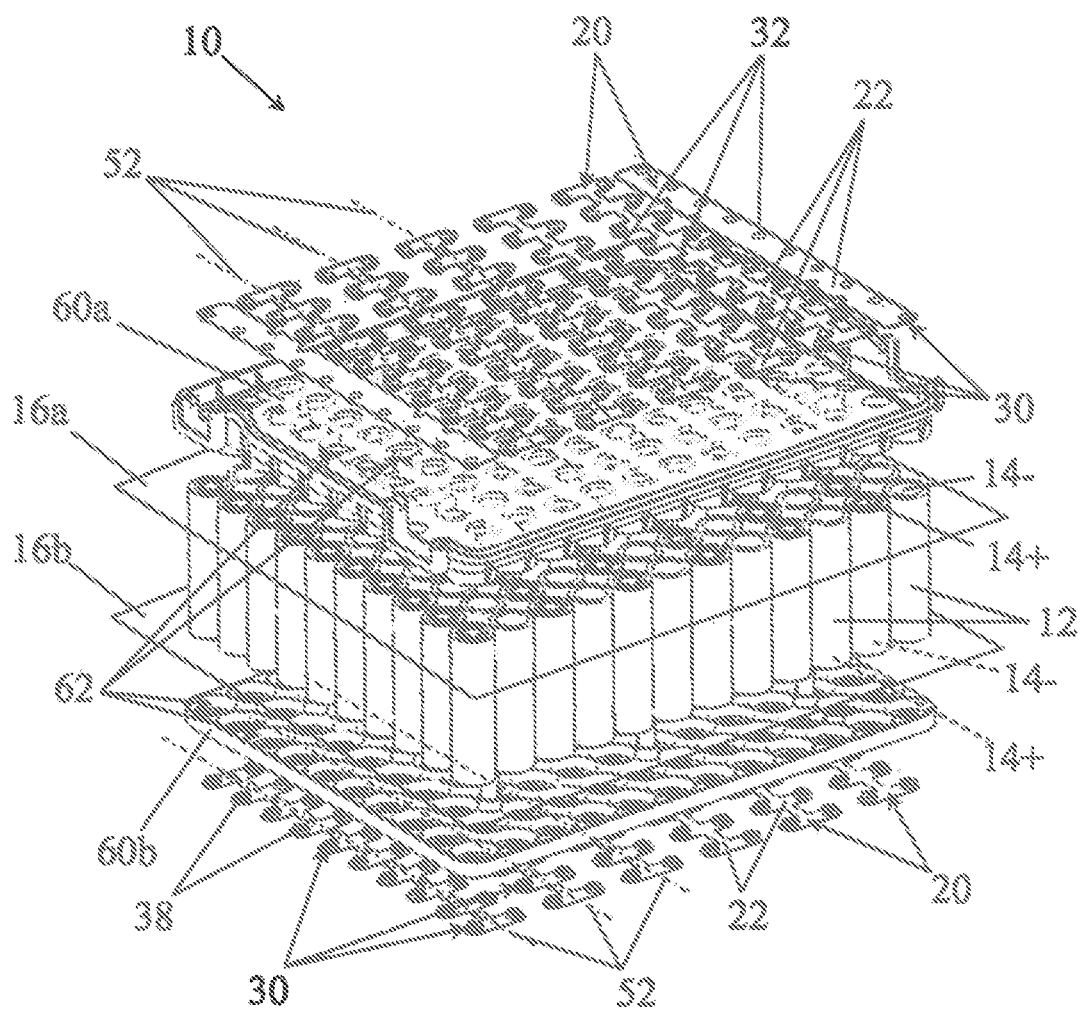
FIG. 7 is an exploded view showing an electric battery according to the invention and using interconnecting devices comparable to the one in FIG. 6.

FIG. 7 shows in an exploded view, a battery of accumulators 10 according to the invention, comprising a plurality of interconnecting devices 20. The battery of accumulators 10 of FIG. 7 also includes a plurality of battery elements 12 positioned here along a regular matrix of 10 lines and 12 columns. The individual battery elements 12 have a cylindrical shape and present terminals 14+, 14− at their ends. The terminals of the opposite ends of the battery elements define two connection planes 16a, 16b. In a same line the battery elements 12 are mounted in alternating fashion with the positive terminal 14+ in the first connection plane 16a, respectively in the second connection plane 16b, then with their negative terminal 14− in the first connection plane 16a, respectively in the second connection plane 16b. In other words, in a same line the successive battery elements are two by two mounted head to tail. In contrast thereto, all the batteries in a same column present one terminal with the same polarity in the first connection plane 16a, respectively in the second connection plane 16b.

Interconnecting devices 20 are provided for interconnecting terminals 14+, 14− of battery elements 12 in each connection plane 16a, 16b. The devices, comparable to FIG. 6, present main axes 52 which are aligned with the columns of battery elements.

The contact areas 30 of the interconnecting devices 20 here present openings 38 identical with those of FIG. 3, so as to favor a ring-shaped contact.

Each interconnecting device 20 is provided in order to connect in parallel the battery elements of a same column and in order to connect in series the battery elements of two consecutive columns. As an illustrative example, a same interconnecting device 20 connects between them all the positive terminals 14+ of the battery elements of a column of battery elements and connects between them all the negative terminals 14− of the battery elements of the adjacent column. The device also connects the positive terminals 14+ of the battery elements of a column, at the negative terminals 14− of the battery elements of the adjacent column.

Particular interconnecting devices 20 are mounted on the end columns 1 and 12. They constitute the terminal interconnecting devices of the battery which will then be connected to the positive and negative terminals of the battery.

The interconnecting devices feature electrically conductive strips 22 extending along strip planes, not referenced, and parallel to the connection planes 16a, 16b.

Between the strip planes and the connection planes 16a, 16b are respectively installed insulators 60a, 60b. The insulators present themselves in the form of plates of an insulating material, for example of plastic material. They have been pierced by a plurality of openings 62 in the form of through-holes and dimensioned to receive the stamped relief of the contact areas 30 of the interconnecting device as well as the magnet and the crimping armature associated respectively to the contact areas.

In this manner, every contact area 30 of every interconnection device is associated to an opening 62 of an insulator 60a, 60b. When the battery is assembled, the contact areas 30 extend through the openings 62 to reach the terminals 14+, 14− of the battery elements 12 in the contact planes 16a, 16b. The insulators 60a and 60b do also have a mechanical function of relative support and maintenance of the elements to each other, and relative to the interconnection devices.

The insulators 60a, 60b associated if applicable to the insulating sleeve 13 of the battery elements 12, visible on FIGS. 2 to 5, make it possible to avoid an undesirable contact of an electrically conductive strip 22 of an interconnection device 20 with the two terminals of a same battery element 12. In effect, a certain number of known battery elements present a negative terminal in the form of an exterior metallic housing which extends from one end of the cylindrical body of the battery element to the opposite end having the positive terminal of the same battery element. The two terminals of such a battery element can thus coexist in a same connection plane.

All the elements 12 of the battery 10 of FIG. 7 can be seated in a battery casing not shown.

The casing may be designed as light-weight in so far as it does not have to contain any pressing forces of the interconnection devices on the battery elements. Maintenance of the interconnection devices 20 in place is ensured by the magnetic forces the magnets 32 of the contact areas 30 exert on the battery elements 12.

During vibrations or shocks the interconnection devices easily admit relative movements of the battery elements among themselves but also weak relative sliding motions between the contact areas and the terminals of the battery elements, while maintaining the contact between the contact areas and the terminals, so there is no risk of fatigue at the contact level and thus no risk of a broken contact during utilization of the battery. The battery elements thus contribute to maintaining the cohesion of the battery.

The invention claimed is:

1. A device for interconnecting battery elements comprising:
    at least one electrically conductive strip having at least one stamped relief with a substantially flat part located at a bottom portion of the at least one stamped relief, the bottom portion constituting at least one contact area of the at least one conductive strip, the at least one contact area being adapted to mechanically and directly contact a terminal of one of the battery elements, wherein the bottom portion presents a round hole that is centered in the substantially flat part and that is surrounded by an electric contact surface to ensure an annular distribution of a surface of contact between the at least one contact area and the terminal, wherein the at least one stamped relief of said at least one conductive strip also forms a side wall extending perpendicular to the substantially flat part, the side wall being adjacent to the at least one contact area and forming a magnet receptacle with the substantially flat part;
    a crimping armature made from a steel ring, thrilling a magnetic flux guide and in contact with and surrounding an external surface of the side wall of the at least one stamped relief; and
    at least one permanent magnet respectively cooperating with the at least one contact area, said at least one permanent magnet being adapted to be secured to the terminal of the battery element by magnetic interaction with the battery element, said at least one permanent magnet being seated in the magnet receptacle with the side wall being interposed between the crimping armature and the permanent magnet, said crimping armature holding said at least one permanent magnet in place via crimping of said at least one permanent magnet to the side wall.

2. The device of claim 1, wherein the contact area has a grip opening.

3. The device of claim 1, wherein said at least one permanent magnet has a cylindrical shape, the crimping armature forming a coaxial ring at said at least one permanent magnet so as to surround said at least one permanent magnet.

4. The device of claim 1, wherein the crimping armature forms a capsule covering a pot of said at least one permanent magnet.

5. The device of claim 1, wherein the contact area extends along a connection plane such that at least either of said at least one permanent magnet or the magnetic flux guide is flush with the connection plane.

6. The device of claim 1, wherein the magnetic flux guide is either a soft-iron guide or a magnetized guide.

7. The device of claim 1, wherein the at least one electrically conductive strip has a copper band.

8. The device of claim 7, wherein said at least one electrically conductive strip has a silver plating.

9. The device of claim 1, wherein said at least one electrically conductive strip has a thickness of between 50 and 200 micrometers.

10. The device of claim 1, wherein said at least one electrically conductive strip has an elongated band shape with a plurality of traverse and generally coplanar appendices, each of the plurality of transverse and generally coplanar appendices having the contact area thereon.

11. A battery having a plurality of battery elements with connection terminals that are connected by the device of claim 1.

12. The battery of claim 11, further comprising:
    at least one connection plane in which a terminal of each of the plurality of battery elements is situated in said at least one connection plane, the device connected to the terminals of the plurality of battery elements.

13. The battery of claim 12, wherein the plurality of battery elements are cylindrical elements that extend perpendicular to said at least one connection plane.

14. The battery of claim 12, further comprising:
    at least one electrical insulator having grid openings at the terminals of the plurality of battery elements, wherein said at least one electrically conductive strip extends along a strip plane, the strip plane being generally parallel to the connection plane, said at least one contact area comprising a plurality of contact areas protruding on the strip plane in a direction of the connection plane, wherein the plurality of contact areas extend through the grid opening.

15. The battery of claim 14, wherein said at least one electrical insulator has a plate of the electrically insulating material that extends between a strip plane and the connection plane.

16. The battery of claim 12, further comprising:

a first connection plane; and a second connection plane opposite to said first connection plane and substantially parallel to said first connection plane, wherein each of the plurality of battery elements has a first terminal situated in said first connection plane and a second terminal situated in said second connection plane, the device being in each of said first connection plane and said second connection plane.

17. The device of claim 1, wherein the at least one electrically conductive strip has at least two contact areas, the at least two contact areas are each adapted to directly contact respective terminals of the battery elements, wherein said at least one electrically conductive strip has at least two stamped reliefs with respective substantially flat parts forming the at least two contact areas, each of the at least two stamped reliefs of said at least one conductive strip also respectively forming a side wall extending perpendicular to the respective substantially flat parts, the side walls being each adjacent to a respective one of the at least two contact areas and forming at least two magnet receptacles with the respective substantially flat parts, said at least one permanent magnet comprising two permanent magnets being respectively seated in the at least two magnet receptacles and crimped to the side walls.

* * * * *